United States Patent [19]
Gaiffe et al.

[11] Patent Number: 5,894,488
[45] Date of Patent: Apr. 13, 1999

[54] LIGHT SOURCE WITH STABILIZED BROADBAND AND ASSOCIATED OPTICAL FIBER GYROSCOPE

[75] Inventors: Thierry Gaiffe; Hervé Lefevre, both of Paris; Nathalie Cerre, Rueil Malmaison; Hervé Arditty, Marly le Roi, all of France

[73] Assignee: Photonetic S.A., Marly le Roi, France

[21] Appl. No.: 08/793,745
[22] PCT Filed: Jul. 12, 1996
[86] PCT No.: PCT/FR96/01090
§ 371 Date: Mar. 12, 1997
§ 102(e) Date: Mar. 12, 1997
[87] PCT Pub. No.: WO97/03488
PCT Pub. Date: Jan. 30, 1997

[30] Foreign Application Priority Data

Jul. 13, 1995 [FR] France ................ 95 08537

[51] Int. Cl.$^6$ ........................... H01S 3/07
[52] U.S. Cl. ................ 372/6; 359/341; 372/99
[58] Field of Search ................... 372/6, 69–71, 372/92, 98, 99, 108; 385/15, 27, 31, 38, 39; 359/341

[56] References Cited

U.S. PATENT DOCUMENTS

| | | | |
|---|---|---|---|
| 4,938,556 | 7/1990 | Digonnet et al. | 359/341 |
| 5,108,183 | 4/1992 | Fling et al. | 372/6 X |
| 5,142,660 | 8/1992 | Chang et al. | 385/10 |
| 5,159,601 | 10/1992 | Huber | 372/6 |
| 5,283,686 | 2/1994 | Huber | 359/337 |
| 5,311,603 | 5/1994 | Fidric | 372/6 X |

FOREIGN PATENT DOCUMENTS

| | | |
|---|---|---|
| 0 372 907 | 6/1990 | European Pat. Off. |
| 0 524 558 | 1/1993 | European Pat. Off. |
| 0 564 098 | 10/1993 | European Pat. Off. |

OTHER PUBLICATIONS

Optical Fiber Sensors, Proceedings of the 6th Inter'l Conference OFS '89, Paris, France, Sep. 18–20, 1989, ISBN 3–540–51719–7, 1989, Berlin, West Germany, Springer–Verlag, West Germany, pp. 143–148, XP002017997, Morkel P R: "Erbium–doped fibre superfluorescent source for the fibre gyroscope".

Electronics Letters, vol. 30, No. 8, Apr. 14, 1994, Stevenage GB, pp. 653–654, XP002000367, D.C. Hall et al, "Wavelength Stability Optimisation in $Er^{3+}$–Doped Superfluorescent Fibre Sources".

*Primary Examiner*—John D. Lee
*Attorney, Agent, or Firm*—Nikaido Marmelstein Murray & Oram, LLP

[57] ABSTRACT

The invention relates to a broadband light source including an amplifying guide structure (1). The light source includes a device (45) of exciting the guide structure (1). The stimulated guide structure (1) emits light (7, 8) that accepts strong spatial coherence and weak time coherence. The light (7) is transmitted forwards (2) having a spontaneous emission spectrum. The light source also includes a rear mirror (5), reflecting only for a narrower range of wavelengths than the spontaneous emission spectrum and produces emission (E) forwards (2) with an emission spectrum controlled around an average wavelength. The rear mirror is inserted between the excitation means and the guide structure.

11 Claims, 2 Drawing Sheets

LIGHT SOURCE WITH STABILIZED BROADBAND AND ASSOCIATED OPTICAL FIBER GYROSCOPE

FIELD OF THE INVENTION

This invention relates to a broadband light source comprising an amplifying guide structure and an associated optical fiber gyroscope.

A broadband means a range of wavelengths with a typical width of between a few nanometers and a few tens of nanometers. This width contrasts with the width of a laser which is less than a tenth of a nanometer.

BACKGROUND OF THE INVENTION

The invention is particularly applicable to optical fiber gyroscopes.

Several means, known per se, may be used to create broadband light sources. It is thus possible to use a fiber source doped with a rare earth, a super light emitting diode (SLED) or an edge light emitting diode (ELED). These light sources offer spatially single mode guide structures and therefore generating light with a strong spatial coherence due to an amplifier effect.

In the presence of an electrical or optical excitation, any one of these sources spontaneously emits photons in all directions. The applied excitation then entrains an amplification of the spontaneous emission in preferred directions by stimulated emission. This is called amplified spontaneous emission (ASE).

Unlike a laser, light emitted by these sources has low time coherence, in other words they are broadband sources and various means are used to preserve this property and avoid a laser effect.

Therefore one known technique is to use a fiber source 1 doped with a rare earth (particularly erbium) as an amplifying guide structure, as shown in FIG. 1. Fiber 1 with length L has a center line 10 with front end 2 and back end 3, and is symmetric about a transverse plane 4. The front end 2 and back end 3 are terminated by the front face 37 and back face 38 respectively.

A theory of the behavior of this amplifier guide structure assumed to be perfect is given below for information, in order to better identify the invention.

During operation, pump waves 6 and 9 with wavelengths $\lambda p$ are transmitted symmetrically towards fiber 1 by pump diodes and excite the rare earth. Once excited, the rare earth emits photons by spontaneous emission in all directions. However pump waves 6 and 9 amplify transmissions in the direction of the center line 10, thus creating two opposite preferred directions of propagation. This leads to two ASEs (Amplified Spontaneous Emissions): one 11 towards the front 2 of fiber 1 called the ASE+, and the other 12 towards the back 3 of fiber 1 called the ASE−, producing two light emissions 7 and 8 in front of and behind fiber 1.

Powers P1 and P2 are transmitted along the fiber 1 towards front 2 and towards back 3 respectively, as shown in FIG. 2, in which axis 15 defines the position along axis 10 in FIG. 1 and axis 16 gives the transmitted power.

Curve 13 shows the power P1 transmitted towards front 2. Curve 14 shows the variation of the power P2 transmitted towards back 3.

Emissions 7 and 8 obtained in outputs correspond to the two powers V3−V4 and V2−V1 respectively.

A major problem encountered in these amplification guide structures is that they have spectral instabilities of emitted light, usually due to thermal variations or the sensitivity of emitted light to excitation conditions. The instabilities may also originate from power variations of pump diodes or mode skips, for example.

It is often necessary to have precise control over the average emission wavelength $\lambda_m$. This is particularly true when using optical fiber gyroscopes, this control being done with a precision of the order of $10^{-4}$ to $10^{-6}$. The stability of the average wavelength $\lambda_m$ is directly related to the stability of an essential characteristic of these gyroscopes, namely the scale factor, which must be precise.

One or several passive filters are usually used in order to successfully stabilize the emission spectrum S around a chosen average wavelength. This type of passive filter appears like a transmission window which is narrower than the emission spectrum window S. It is placed in an arbitrary position between the light source and the receiver. Its use leads to a stable emission spectrum S, and to very short wavelength fluctuations. However this passive filtering has the disadvantage of causing a severe loss of power.

EP-A-0,564,098 describes a device to create optical noise with a predetermined band width. This device comprises an optical amplifier producing an optical noise not polarized by spontaneous emission, a mirror reflecting optical noise towards the optical amplifier and a filter eliminating the optical noise components outside a predetermined band width.

EP-A-0,524,558 describes a super light emitting optical source. This source comprises an optical fiber doped with a rare earth, fiber pumping means to create a spontaneous emission, means selectively reflecting light on a given band width and optical coupling means at one end of the fiber with the reflecting means.

U.S. Pat. No. 5,283,686 concerns an optical system with a reflecting network. This optical system comprises a circulator, the first gate of which is coupled to an optical amplifier, a second gate to a Bragg network selectively reflecting the amplified signal over a given band width, and a third gate to an output line.

SUMMARY OF THE INVENTION

This invention concerns a broadband light source with a high spatial coherence and a stable wavelength with simple elements without being subject to a significant power loss;

Another purpose of the invention is to check the average wavelength of the emission spectrum with a precision of the order of $10^{-4}$ to $10^{-6}$.

Another purpose of the invention is to stabilize the broadband of the emitted light.

An additional objective of the invention is a broadband light source to prevent the presence of multiplexers.

Another purpose of the invention is a broadband light source with a controlled emission spectrum around an average wavelength variable in time, and in particular this wavelength is modulable.

Another purpose of the invention is a gyroscope with optical fiber comprising a broadband source stabilized in wavelength with simple elements, particularly in order to avoid the presence of multiplexers.

The invention thus relates to a broadband light source comprising an amplifying guide structure with one front face and one back face, and a means of exciting the guide structure. The guide structure excited by the excitation means emits light forwards and backwards, the light emitted forwards having a spontaneous emission spectrum.

This light source comprises a rear mirror reflecting only for a narrower range of wavelengths than the spontaneous emission spectrum, and produces an forward emission with a controlled emission spectrum around an average wavelength.

According to the invention, the rear mirror is interposed between the excitation means and the guide structure.

The light source according to the invention is distinguished from a laser, particularly due to the fact that the emission spectrum is wide, as specified above. Its physical operation and its manufacturing conditions are obviously very different.

The reflection properties of the rear mirror determine the source emission spectrum. A mirror reflecting only a relatively narrow range or band of wavelengths is said to be chromatic. The concept of narrowness is due to the fact that this range only covers part of the spontaneous emission spectrum, but it is still wide compared with the width of the emission spectrum of a laser. It is usually between a few nanometers and a few tens of nanometers and defines the width and position of the source emission spectrum.

The position of the excitation means at the back of the rear mirror is unlike known devices and contradicts what has been accepted in the past. We might have expected that photons emitted backwards by the guide structure and not reflected by the rear mirror would disturb the excitation means. On the contrary, the claimed light source is reliable.

Furthermore, it has the advantage that it is particularly simple. In particular, it can avoid the presence of multiplexers and thus overcome problems related to them.

The emission spectrum is controlled by the rear mirror in order to obtain the required stabilization. The average wavelength of this spectrum then has a fixed value.

In this case, the light source beneficially has control means in order to servocontrol the average wavelength to drifts in the emission spectrum. These control means act by counter-reaction.

The stabilization is more precise when the width of the range of wavelengths for which the mirror reflects is narrow.

Since the spontaneous emission spectrum accepts at least one peak at one peak wavelength, it is useful if the range of wavelengths for which the mirror is reflecting is approximately centered on one of the peak wavelengths. Preferably, the range of wavelengths is then approximately centered on the smallest of these peak wavelengths.

Emission spectrum control may also be used to impose fluctuations and particularly modulations, on the average wavelength.

Thus in a preferred embodiment, the rear mirror comprises means of varying the range of wavelengths with time. The rear mirror then controls variations in the average wavelength.

According to a first preferred design of the rear mirror, the mirror comprises a Bragg mirror and more particularly a Bragg photo-network inscribed in an optical fiber.

Typically, it is designed to be reflecting for a spectrum width equal to several nanometers.

The Bragg mirror is preferably used in conjunction with a means of temperature control.

This temperature control means makes it possible to use the rear mirror in two ways mentioned above, since the reflection properties of the rear mirror depend on the temperature in a known manner: stabilization of the emission spectrum, or control of average wavelength variations.

According to a second preferred design of the rear mirror, the mirror is composed of a Fabry-Perot type device comprising a wide band mirror interfering with the rear surface of the guide structure.

The guide structure preferably belongs to an assembly comprising a fiber source doped with a rare earth, a super light emitting diode and an edge light emitting diode.

More particularly, in a preferred embodiment of the guide structure, it is a fiber source doped with erbium.

The light source preferably comprises at least one insulator at the front of the guide structure, designed to prevent a laser effect in the guide structure which would correspond to a strong time coherence.

Preferably, the excitation means is an optical pump diode.

Another purpose of the invention is an optical fiber gyroscope, comprising a broadband light source such as the claimed source.

DESCRIPTION OF THE DRAWINGS

This invention will now be illustrated with reference to the drawings in the appendix, but in no way being restricted by the example embodiments, in which.

DESCRIPTION OF THE PREFERRED EMBODIMENTS

Figure 1:
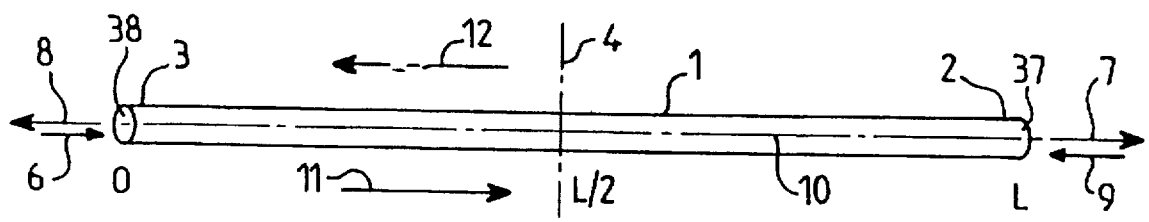
FIG. 1 mentioned above shows a guide structure used in a normal broadband light source, FIG. 2 mentioned above is a diagram showing powers transmitted forwards and backwards respectively in the guide structure in FIG. 1.
Figure 2:
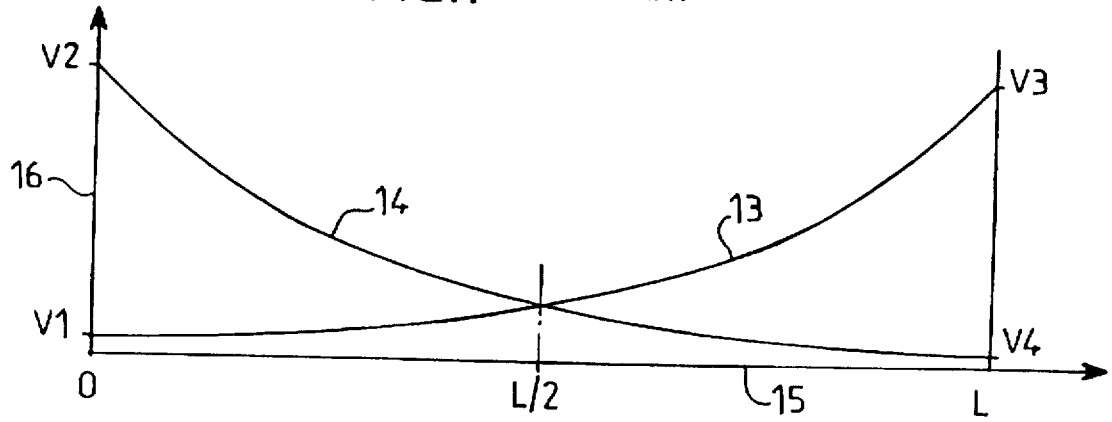
Figure 3:
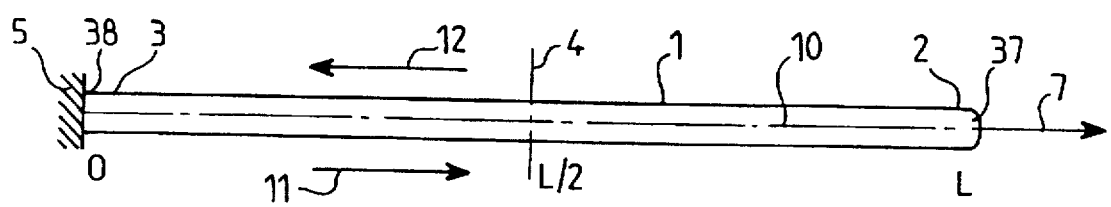
FIG. 3 shows part of a light source according to the invention.
Figure 4:
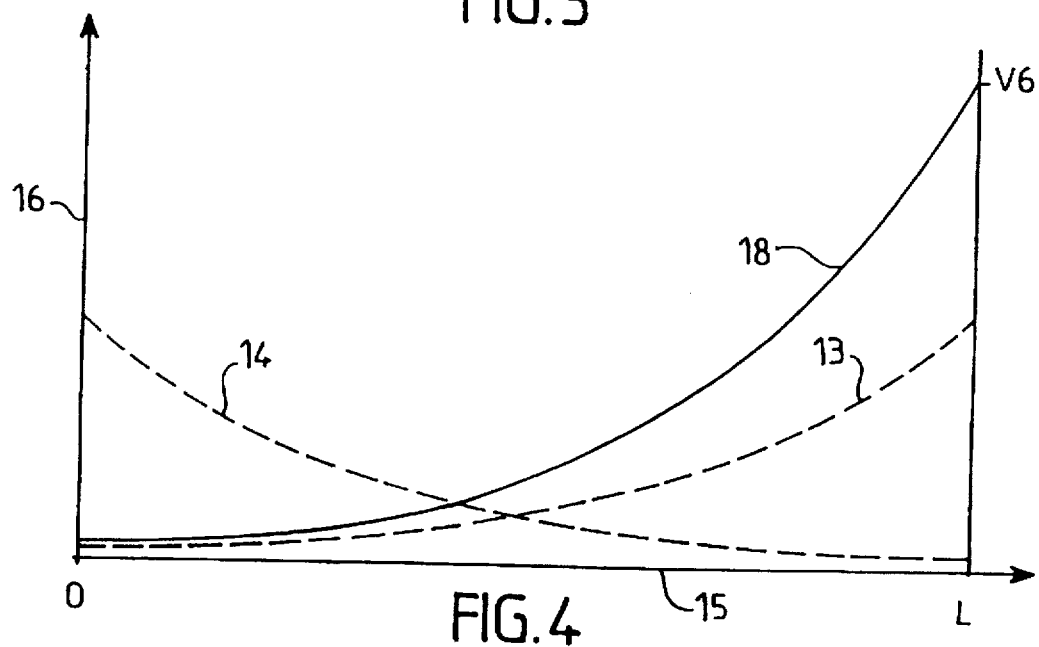
FIG. 4 is a graphic representation showing the power transmitted forwards in the guide structure in FIG. 3, in the light source according to the invention.

In FIGS. 3 and 4, elements similar to those in FIGS. 1 and 2 have been assigned the same numeric references. These elements have been described above. A rear mirror 5 is placed at the back of fiber 1. Thus when equilibrium is reached, the power P1 transmitted towards the front 2 of fiber 1 is modified, due to the fact that the power P2 directed towards the back 3 of fiber 1 is reflected by mirror 5.

A simplified theory is used in the following description, as above, in order to explain the invention more clearly.

Curve 18 of the power P1 transmitted towards the front 2 in the light source according to the invention can be compared with power curves 13 and 14 described above, as shown in FIG. 4. The power P1 increases uniformly from the rear face 38 until the front face 37. Curve 18 increases for increasing values of the abscissa along the position axis 15 along fiber 1. The power P1 thus increases significantly until it reaches a value V6 close to V2+V3, i.e. 2×V3, at surface 37.

The rear mirror 5 determines the balance that is set up and the properties of the light flows 7 emitted forwards from fiber 1.

Figure 5:
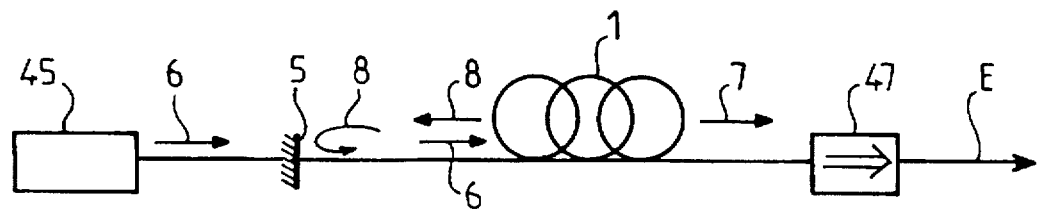
FIG. 5, is an embodiment of a light source according to the invention, FIG. 6A corresponds to a first length of the guide structure of the light source in FIG. 5, and is a diagrammatic representation as a function of the wavelength, the power spectral density of the light emitted forwards from the guide structure considered in isolation, and the reflection coefficient of the rear mirror in the light source in FIG. 5.

In a particularly beneficial embodiment shown in FIG. 5, the light source comprises a pump diode 45, the rear mirror 5, the fiber 1 and an isolator 47, all these elements being connected in order in series. Other means such as an absorber may be used instead or in association with isolator 47 to avoid a laser effect. The light source is thus suitable for generating an emitted light E at the output from isolator 47 with high spatial coherence and low time coherence usable in applications.

The pump diode 45 is designed for optical pumping of fiber 1 at a pump wavelength $\lambda p$ of the rare earth contained in fiber 1. For example for erbium, this wavelength $\lambda p$ may be 980 nm or 1480 nm.

The rear mirror 5 is reflecting within a narrow width or band of wavelengths, so that the spectral content of the light emitted E can be stabilized around an average wavelength.

Figure 6A:
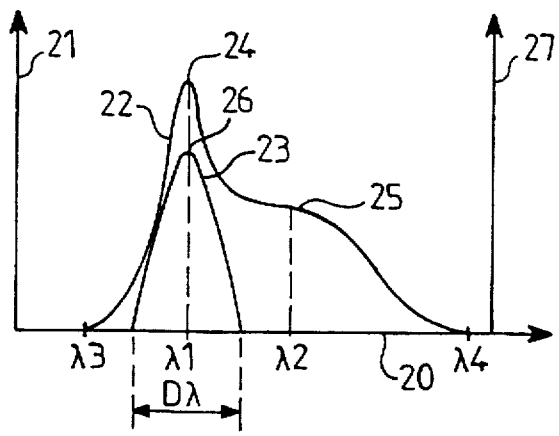
FIG. 6B is the first length of the guide structure, and is a diagrammatic representation of the forwards power spectral density output from the guide structure in the light source in FIG. 5 at equilibrium, as a function of the wavelength, FIG. 7A corresponds to a second length of the light source guide structure in FIG. 5, greater than the first, and is a diagrammatic representation of the power spectral density of the light emitted forwards from the guide structure considered in isolation, and the reflection coefficient of the rear mirror in the light source in FIG. 5, as a function of the wavelength, FIG. 7B corresponds to the second length of the guide structure, and diagrammatically shows the power spectral density of the light emitted forwards from the guide structure in the light source shown in FIG. 5 at equilibrium, as a function of the wavelength.

A typical shape of the emission properties of fiber 1 taken in isolation is shown in FIG. 6A. The first axis 20 gives the wavelength considered and axis 21 gives the power spectral density or DSP. The spontaneous emission curve 22 is close to the wavelength axis 20 corresponding to zero power spectral density below a wavelength $\lambda 3$. It then increases quickly with the wavelength to reach a peak 24 at a wavelength $\lambda 1$. The curve 22 then decreases suddenly, then starts to decrease slowly forming a plateau 25 around a wavelength $\lambda 2$. Its decay then accelerates and curve 22 becomes approximately coincident with axis 20 beyond wavelength $\lambda 4$.

Curve 22 depends on the physicochemical properties of fiber 1 such as for example the erbium concentration, but also on its length L and the pumping power transferred by pump diode 45. An increase in the length L of fiber 1 tends to modify the curve 22 in the same way as a reduction in the power output by the pump diode 45.

For example, if fiber 1 is doped with erbium, the wavelength $\lambda 1$ and $\lambda 2$ are close to 1530 nm and 1560 nm respectively. Curve 22 then corresponds to a short length L of fiber 1, of the order of 2 m.

Figure 7A:
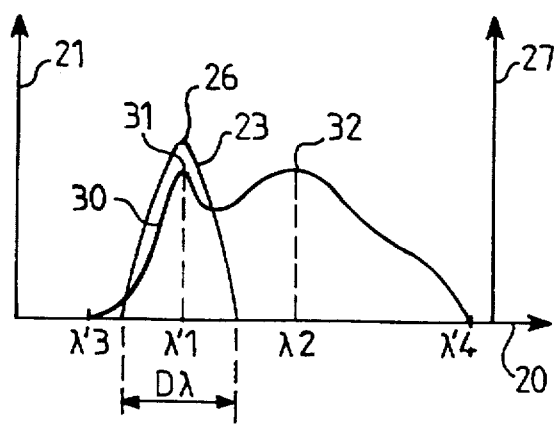
Figure 7B:
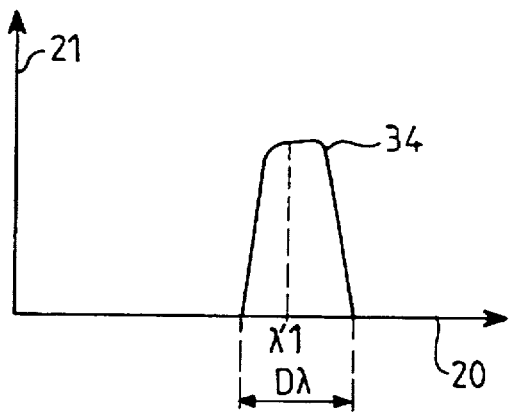

For a length L of fiber 1 equal to 10 m instead of 2 m, a curve 30 is obtained instead of the previous curve 22, this curve 30 being plotted in FIG. 7A. As above, curve 30 is approximately coincident with axis 20 below a wavelength $\lambda'3$, and above a wavelength $\lambda'4$. These values $\lambda'3$ and $\lambda'4$ are very close to wavelengths $\lambda 3$ and $\lambda 4$ respectively. Curve 30 quickly increases beyond $\lambda'3$ until it reaches a peak 31 at a wavelength $\lambda'1$ close to $\lambda 1$. However, the peak 31 is significantly lower than the peak 24 of curve 22. Curve 30 then decreases suddenly but very briefly, and then once again starts to increase to a maximum 32, approximately at wavelength $\lambda 2$. Curve 30 then gradually decreases until it reaches axis 20 at $\lambda'4$. Wavelength $\lambda'1$ is, like $\lambda 1$, close to 1530 nm.

Curve 30 obtained with an increase in the length L of fiber 1, may also be obtained by reducing the power emitted by the pump diode 45.

The rear mirror 5 includes a reflection window centered around a wavelength. The spectrum S of the light emitted, E, by the source is stable around this wavelength.

In the examples presented, the width of the window is equal to $D\lambda$, the centering wavelength being equal to $\lambda 1$ and $\lambda'1$ for fiber 1 length L equal to 2 m and 10 m respectively. The coefficient of reflection of the rear mirror 5 as a function of the wavelength can be shown, as in FIGS. 6A and 7A. The curve is drawn in an orthogonal coordinate system comprising two axes 20 and 27, the first axis 20 being the wavelength and the second 27 giving the reflection coefficient. Typically, this gives a curve 23 symmetric about the centering wavelength $\lambda 1$, $\lambda'1$ and not coincident with the axis 20 over a width $D\lambda$.

Curve 23 thus increases uniformly starting from axis 20 up to a peak 26, reaches the centering wavelengths $\lambda 1$, $\lambda'1$ and then decreases to axis 20.

In general, it is better if the centering wavelength coincides with a wavelength for which the spontaneous emission curve is a maximum. This is done in the two examples described, for L=2 m and L=10 m respectively. For length L of fiber 1 equal to 10 m, the reflection curve 23 may also be centered on the wavelength $\lambda 2$ associated with the maximum 32.

Preferably, the wavelength chosen is the minimum corresponding to a peak. This is actually done in the examples, these wavelengths being $\lambda 1$ and $\lambda'1$ for L=2 m and L=10 m respectively.

The rear mirror 5 with selected wavelengths preferably consists of a Bragg mirror and more particularly a Bragg network photo-inscribed in an optical fiber. This has the main advantages of its fiber shape, its compactness and the lack of power losses. However it is very sensitive to temperature variations, its relative variations I in the medium wavelength being of the order of $7.10^{-6}$. This is why it is important to control the temperature.

To do this, it is useful to add a means of controlling the temperature to the photo-inscribed Bragg network, and more generally to the Bragg mirror. For example, this means may consist of a thermal element like that marketed under the name of "Peltier element". It may also be composed of a heating resistance such as a thermistance with a positive temperature coefficient (or CTP).

This means of controlling the temperature stabilizes curve 23 giving the reflection coefficient of the rear mirror 5 as a function of the wavelength.

The width $D\lambda$ of wavelengths corresponds to the spectrum width of emitted light E. It is typically chosen to be between a few nanometers and a few tens of nanometers.

Another solution is to use a Fabry-Perot type device comprising a wide band mirror interfering with the rear end 3 of fiber 1. A variation in the position of the wide band mirror can cover the required range of wavelengths.

During operation, the pump diode emits a pump wave 6 at the pump wavelength $\lambda p$. This passes through mirror 5 which is transparent for this wavelength and directly reaches the rear end 3 of fiber 1. The stimulated fiber 1 then produces front emissions 7 and rear emissions 8. Their spectral properties are identical at the very beginning of the emission, and correspond to the previously described curves 22 or 30.

Figure 6B:
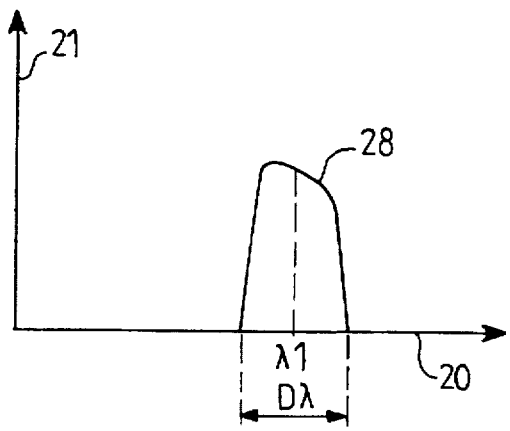

The rear emission 8 reaches the rear mirror 5 and is partially reflected as a function of the characteristics of the rear mirror 5. The rear emission properties 8 modified by the rear mirror 5 result from the DSP curve 22 and the reflection coefficient curve 23 as a function of the wavelength. Curve 28 showing the reflected rear emission 8 is shown in FIG. 6B. Curve 28, approximately related to the product of the functions corresponding to curves 22 and 23 except for a multiplication factor, has a width of D$\lambda$ and is centered around the wavelength $\lambda 1$.

By using a Bragg mirror with a means of controlling the temperature, the wavelength $\lambda 1$ can be automatically and directly controlled by a servocontrol with a counter-reaction associated with this means.

Note that as the width D$\lambda$ associated with the mirror 5 becomes narrower, the spectral stabilization obtained at the front output improves. In a limiting embodiment for which the rear mirror 5 reflection coefficient curve reduces to a hyper-thin line centered on $\lambda 1$, the width D$\lambda$ is zero. The same is true for the relative variation I defined above, which means that spectral instabilities are completely eliminated.

A similar result is obtained for a second fiber 1 of length L, associated with the DSP curve 30 and the reflection coefficient curve 23 as a function of the wavelength. The spectral content of the reflected rear emission 8 is shown on curve 34 which is centered around the wavelength $\lambda'1$, has a width equal to D$\lambda$ and an approximately rectangular shape.

The reflected rear emission 8 then returns to fiber 1 that it passes through from the back 3 towards the front 2. Its spectral content does not a priori excite fiber 1, although this possibility is not excluded. Forwards emission 7 is thus enriched by this reflection, and after passing through isolator 47, produces the emitted light E.

When the system equilibrium is reached, emitted light E has an emission spectrum S with a width approximately equal to D$\lambda$, stabilized around $\lambda 1$ or $\lambda'1$ depending on whether the L=2 m or L=10 m example is used.

In another variation of this same embodiment, fiber 1 is doped with erbium and has a length L=15 m, the rear mirror 5 comprising a Bragg network photo-inscribed in an optical fiber. This Bragg network generates a reflection coefficient curve centered on a wavelength equal to 1530 nm and accepting a width D$\lambda$ equal to 5 nm. The rear mirror 5 also comprises a thermal element of the type called a "Peltier element" to control its temperature. It is then observed that the relative variation I of the average wavelength $\lambda_m$ is less than $50.10^{-6}$ during and after the temperature cycles between $-20°$ C. and $60°$ C. The transmission spectrum S output from the front of fiber 1 is thus stabilized.

The relative variation I under similar conditions but with a traditional mirror is of the order of $400.10^{-6}$.

Variations of the average wavelength $\lambda_m$ of the emission spectrum S in time can also be controlled. By choosing temperature as the control parameter v, it is found that the relative variation V(v) is equal to about $7.10^{-6}/°$ C. The average wavelength $\lambda_m$ can also be adjusted precisely by varying the temperature.

Use of the rear mirror 5 which has selective wavelengths enables a very efficient active filtering: stabilization of the emitted light E spectrum S around the average value $\lambda 1$, $\lambda'1$ is quite satisfactory. Furthermore, this active filter generates very low losses, unlike the passive filtering normally used. The presence of the rear mirror 5 is equivalent to a simple modification of the boundary conditions. Active filtering acting within the light source itself makes it unnecessary to place a passive filter on the downstream end.

In an alternative embodiment of light sources according to the invention, fluctuations in one or several instability parameters u are tolerated. This variant is possible if the parameters concerned can be measured and if the relative variation V as a function of these parameters is perfectly known. Instead of attempting to stabilize the emission spectrum S, these parameters are then measured and the variations of the average wavelength $\lambda_m$ are deduced from them. For example, the temperature may form one such instability parameter since the rear mirror 5 comprises a Bragg network.

In another embodiment of the invention, the rear mirror 5 plays a role other than filtering; appropriate means are provided so that it can control variations of the average wavelength $\lambda_m$ in time. These means act on the dependence of the coefficient of reflection of the mirror 5 on the wavelength.

For example, one such means is formed by the means of temperature control previously described for the Bragg mirror. The temperature then forms a control parameter v for the average wavelength. The tension exerted on the fiber in which a Bragg network is photo-inscribed may also fulfill this role.

Control of the emitted light spectrum E for stabilization or control of variations, may also be obtained by other means such as a property electronic control of the rear mirror 5.

A light source according to the invention may advantageously be used in devices requiring strong spatial coherence and weak time coherence, and good spectral stability. This is the case particularly in an optical fiber gyroscope.

We claim:

1. Broadband light source comprising an amplifying guide structure with a front side and a back side, and an excitation means for excitation of the amplifying guide structure, the amplifying guide structure excited by the excitation means emitting light towards the front and back sides, the light emitted forwards having a spontaneous emission spectrum, the broadband light source comprising:

a rear mirror reflecting only for a narrower range of wavelengths than said spontaneous emission spectrum, and producing an emission forwards with an emission spectrum controlled about an average wavelength, wherein the rear mirror is positioned between the excitation means and the amplifying guide structure and comprises means of varying a range of wavelengths in time, the rear mirror being used to control variations of the average wavelength, wherein the rear mirror comprises a Bragg mirror.

2. Light source according to claim 1, wherein said spontaneous emission spectrum accepting at least one peak at a peak wavelength, said range of wavelengths for which the rear mirror is reflecting is approximately centered on one of the wavelengths.

3. Light source according to claim 2, wherein said range of wavelengths is approximately centered on a smallest of the peak wavelengths.

4. Light source according to claim 1, wherein the Bragg mirror is a Bragg network photo-inscribed in an optical fiber.

5. Light source according to claim 4, wherein the rear mirror comprises a temperature control means.

6. Light source according to claim 1, wherein the amplifying guide structure belongs to an assembly comprising a fiber source doped with a rare earth, a super light emitting diode and an edge light emitting diode.

7. Light source according to claim 6, wherein the amplifying guide structure is a fiber source doped with erbium.

8. Light source according to claim 1, further comprising at least one isolator in front of the amplifying guide structure, designed to prevent a laser effect in the amplifying guide structure.

9. Light source according to claim 1, wherein the excitation means is an optical pump diode.

10. Broadband light source comprising an amplifying guide structure with a front side and a back side, and an excitation means for excitation of the amplifying guide structure, the amplifying guide structure excited by the excitation means emitting light towards the front and back sides, the light emitted forwards having a spontaneous emission spectrum, the broadband light source comprising.

a rear mirror reflecting only for a narrower range of wavelengths than said spontaneous emission spectrum, and producing an emission forwards with an emission spectrum controlled about an average wavelength, the rear mirror being positioned between the excitation means and the amplifying guide structure and comprises means of varying a range of wavelengths in time, the rear mirror being used to control variations of the average wavelength, said spontaneous emission spectrum accepting at least one peak at a peak wavelength, said range of wavelengths for which the rear mirror is reflecting is approximately centered on one of the wavelengths, said range of wavelengths being approximately centered on a smallest of the peak wavelengths, the rear mirror comprising a Bragg mirror which is a Bragg network photo-inscribed in an optical fiber, said rear mirror comprising a temperature control means, the amplifying guide structure is a fiber source doped with erbium and belongs to an assembly comprising a fiber source doped with a rare earth, a super light emitting diode and an edge light emitting diode, said light source comprising at least one isolator in front of the amplifying guide structure, designed to prevent a laser effect in the amplifying guide structure and the excitation means being an optical pump diode.

11. Optical fiber gyroscope comprising a broadband light source according to claim 10.

* * * * *